United States Patent [19]

Converse et al.

[11] Patent Number: 4,818,295
[45] Date of Patent: Apr. 4, 1989

[54] CYCLONE REACTOR

[75] Inventors: Alvin O. Converse, Norwich, Vt.; Hans E. Grethlein; Joseph E. Holland, both of Hanover, N.H.

[73] Assignee: The United States of America as represented by the United States Department of Energy, Washington, D.C.

[21] Appl. No.: 848,245

[22] Filed: Apr. 4, 1986

[51] Int. Cl.⁴ .................... B01J 3/00; B01D 47/00
[52] U.S. Cl. .......................... 127/1; 127/37; 55/263; 55/459.1; 261/79.2; 422/224; 422/195; 162/243; 162/246; 162/249; 162/250
[58] Field of Search ............... 127/1, 37; 422/224, 422/195; 162/243, 246, 249, 250; 34/57 R; 261/79.2; 55/263, 459 R

[56] References Cited

U.S. PATENT DOCUMENTS

| | | | |
|---|---|---|---|
| 2,304,679 | 12/1942 | Christensen | 127/1 |
| 2,737,414 | 3/1956 | Wenzel | 422/224 |
| 2,739,876 | 3/1956 | Felger | 422/224 |
| 3,284,055 | 11/1966 | Johansen | 162/243 |
| 3,322,506 | 5/1967 | Wempe et al. | 422/224 |
| 3,495,949 | 2/1970 | Niedner et al. | 422/224 |
| 3,519,397 | 7/1970 | Bogdanov et al. | 422/195 |
| 3,739,910 | 6/1973 | Wilson | 209/144 |
| 3,802,570 | 4/1974 | Dehne | 55/459 R |
| 3,920,423 | 11/1975 | Ross | 55/263 |
| 4,005,998 | 2/1977 | Gorman | 55/459 R |
| 4,059,419 | 11/1977 | Ross | 261/79.2 |
| 4,205,965 | 6/1980 | Bielefeldt | 55/459 R |
| 4,273,750 | 6/1981 | Hollet, Jr. et al. | 55/459 R |
| 4,339,206 | 7/1982 | Ahs | 162/243 |
| 4,612,088 | 9/1986 | Nardi | 162/250 |

FOREIGN PATENT DOCUMENTS 329600 5/1930 United Kingdom ................ 127/1

OTHER PUBLICATIONS

Holland, "A Cyclone Reactor for the Acid Hydrolysis of Cellulosic Biomass", Thesis, Thayer School of Engineering, May 1985.

Primary Examiner—W. J. Shine
Assistant Examiner—Chung K. Pak
Attorney, Agent, or Firm—Hugh W. Glenn; Robert J. Fisher; Judson R. Hightower

[57] ABSTRACT

A system is provided to produce sugars from a liquid-solid mixture containing biomass, and an acid, wherein the mixture is heated to an appropriate temperature to achieve hydrolysis. The liquid-solid mixture is introduced as a stream into the circular-cylindrical chamber of a cyclone reaction vessel and steam is introduced to the vessel to provide the necessary heat for hydrolysis as well as to establish the liquid-solid mixture in a rotary flow field whereby the liquids and solids of the mixture move along spiral paths within the chamber. The liquid-solid mixture may be introduced at the periphery of the chamber to spiral down toward and be discharged at or near the center of the chamber. Because of differing mass, the solid particles in the mixture move radially inward at a different rate than the liquid and that rate is controlled to maximize the hydrolysis of the solids and to minimize the decomposition of sugars, thus formed.

3 Claims, 1 Drawing Sheet

CYCLONE REACTOR

The United States Government has rights in this invention pursuant to Subcontract No. SERI-XX-4-04048-1 under Prime Contract No. DE-AC02-83CH10093 among Dartmouth College, the Midwest Research Institute and the U.S. Department of Energy.

The present invention relates to systems for converting solids to soluble products which are themselves subject to decomposition; an aspect of the invention is conversion of biomass to such products and includes conversion of cellulosic and lignocellulosic substances to sugars.

The term biomass, as used herein, includes cellulosic and lignocellulosic materials, both natural and processed, as well as natural organic materials more broadly. Attention is called to a thesis of Holland (one of the inventors herein) which is hereby incorporated herein by reference. Emphasis in the discussion below is placed on producing sugars from cellulosic and lignocellulosic substances, but the invention is broader than that aspect thereof.

In the thesis, mention is made of a plug flow reactor which may be used to achieve hydrolysis of cellulosic and lignocellulosic substances to sugars. One characteristic of the plug flow reactor is that all materials within the reactor have the same residence time. Hence, sugars formed early in the process often decompose while some of the solids never fully react. Ideally, a system to achieve such hydrolysis permits withdrawal of sugars, once formed, immediately after such formation to prevent decomposition thereof, while nevertheless permitting all solids within the system to react and form sugars. The system disclosed is one which uses a cylindrical reaction vessel in which a slurry is introduced tangentially in order to achieve rotation about the axis of symmetry, the net flow being in the radial direction.

Accordingly, it is an objective of the present invention to provide a system which does permit withdrawal of newly formed sugars and increased reaction of solids, both features resulting in enhanced yields.

Another objective of the invention is to provide a cyclone reactor in which the reacting materials are moved tangentially and radially in a manner that permits optimizing the yield of the desired product.

Still another objective is to provide a reactor which permits more complete utilization of solid reactants than in a plug flow reactor.

A still further objective is to provide a system that yields higher product concentration than a plug flow reactor.

A still further objective is to provide a system that reduces solids deposited on reactor walls.

A still further objective is to provide a system that can be operated continuously.

These and still further objectives are addressed hereinafter.

The foregoing objectives are achieved in a process for producing sugars (or other products subject to decomposition) that includes establishing a rotating flow field of a liquid-solid (or other two-phase) mixture in which a reaction occurs to produce an intermediate soluble product; and controlling the flow of the solids in the mixture relative to the liquid therein to reduce decomposition of the sugars, once formed and, hence, increase the degree to which the solids are reacted. The mixture is adjusted to a proper pH to achieve hydrolysis and the temperature and pressure thereof are controlled appropriately.

BRIEF DESCRIPTION OF THE DRAWING

The invention is hereinafter described with reference to the accompanying drawing in which:

Turning now to FIG. 1, there is shown a system for producing a product, such as sugars, from a two-phase mixture, typically a liquid-solid mixture or slurry, introduced to the system at 1. The slurry is introduced as a stream through a pipe 11 to a cyclone reactor vessel 6 after having had a mineral acid or base (e.g., $H_2SO_4$ or NaOH) mixed therewith in the pipe 11 or as part of the original slurry. The cyclone reactor 6 discussed first is that shown at 6A in FIG. 2A, which is cylindrical and has a circular cyclone chamber 98A wherein the slurry and steam (i.e., a condensing vapor) are introduced as a stream through inlets 10 and 11, respectively, at the periphery of the reactor vessel 6A. (The steam and slurry can be introduced combined through a single pipe to the chamber 98A, but typically are not; two or more pipes may be used.) The slurry is forced into the reactor vessel 6A under pressure from a pump 2 in FIG. 1A; the combination of the pumped input slurry and the input steam serve to establish the slurry in a rotating flow field whereby the slurry moves within the reactor vessel 6A as a liquid-solid mixture along a spiral path from the periphery of the vessel toward the center thereof where it is discharged through an outlet port or pipe 13 at or near the center of the reactor vessel 6A. The steam condenses soon after it enters the reactor. In the course of flow from the periphery to the center of the vessel 6A, the liquids and solids follow a rotating flow field having a tangential component of velocity (e.g., $V_T$ for a solid 99 in FIG. 2A) and an inwardly-directed radial component (e.g., $V_R$ for the solid 99). The rate of the inwardly directed radial component of flow of the liquid (water) portion of the mixture relative to the inwardly-directed radial flow of the solid (biomass) particles is different owing to the centrifugal acceleration and the density difference between the liquid and the solid. Hence, the residence times of the liquid portions and the solid portions of the mixture differ and in this way the residence time of the liquid portion which contains sugars formed is reduced to decrease the time alloted to the sugar decomposition while the residence time of the solids is increased to increase the time allotted to hydrolysis in order to increase the utilization of the substance. The present system permits enhanced control of the residence time within the reaction chamber 98A of the reactor 6A of the solids relative to the liquids, thereby to maximize the yield of sugars. At the output port or pipe 13, the liquids discharged are removed through a letdown orifice 7 in FIG. 1A to effect a pressure drop causing adiabatic flash cooling and, thus, quickly stopping the hydrolysis process.

Figure 1A:
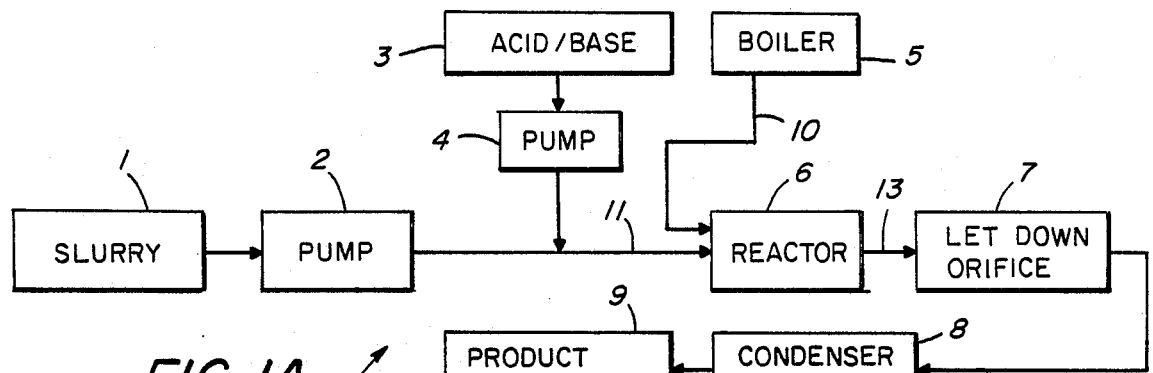
FIG. 1A is a diagrammatic representation of a system to practice the present invention.

The system 101 in FIG. 1A includes a slurry pump 2, an acid/base source 3, an acid/base pump 4, and a steam boiler 5. The slurry and steam are shown to be introduced through separate pipes 11 and 10, respectively, which is the way it is done in actual apparatus. The rate at which the slurry is inroduced at 11, the steam introduced at 10, and shape of the reaction chamber within the reactor vessel 6 all affect the velocities of the liquid and the solid within the chamber. A condenser cooler 8 and a product accumulator 9 complete the system 101. The system 101 with the reactor vessel 6A (of FIGS. 2A and 2B) disposed at 6 in FIG. 1A is called a co-current system by the present inventors.

Figure 1B:
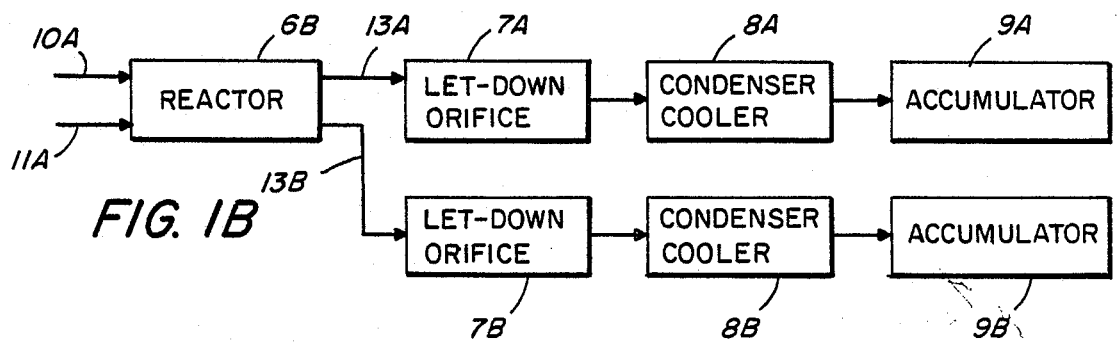
FIG. 1B shows diagrammatically a modified version of some parts of the system in FIG. 1A.
Figure 3A:
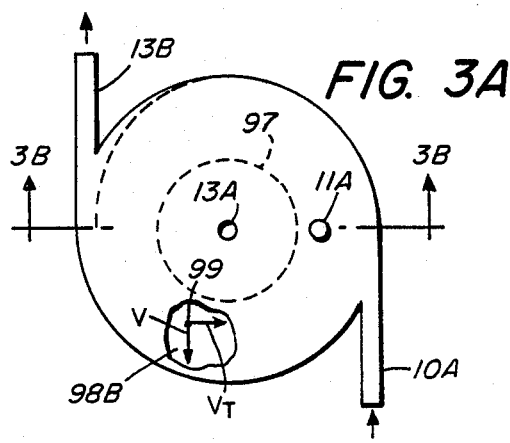
FIG. 3A is a diagrammatic plan view, partly cutaway, of a modification of the cyclone reactor in FIG. 2A.
Figure 3B:
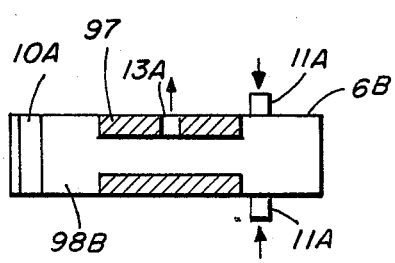
FIG. 3B is a section view taken of the line 3B—3B in FIG. 3A looking in the direction of the arrows.

A countercurrent system is shown in FIG. 1B where the reactor labeled 6B is the reactor vessel in FIGS. 3A and 3B, the inlets to which are 11A and 10A respectively to introduce slurry and steam to the reactor, as now explained. The reactor vessel 6B in FIG. 3B is also cylindrical and has a circular cylindrical interior reaction chamber 98B having a first input 11A near, but slightly outwardly, radially spaced from the center of the chamber to receive a slurry as input; a second input port 10A is located at or near the periphery of the reaction chamber 98B to receive steam. The rotating flow field within the chamber 98B is regulated to a value at which the liquid (water) moves radially inwardly from the periphery toward the center of the cylindrical reactor vessel 6B, carrying with it sugars formed within the chamber 98B. (It should be noted that most of the sugars formed within the chamber 98B are formed nearest the center of the chamber because that is where the slurry is introduced and, hence, is the location of the densest concentration of fresh solid reactant. Since this is close to the liquid outlet or pipe labeled 13A, the sugars, thus formed, have little time to decompose.) While the liquid in the reaction chamber 98B moves generally radially inward, the solids move generally radially outward, hydrolyzing as they go, the unhydrolyzed solids being discharged at 13B as a slurry.

The liquid emitted at 13A in FIG. 3B passes through a letdown orifice 7A to a condenser cooler 8A and thence to an accumulator 9A in FIG. 1B; the slurry discharged at 13B passes through a letdown orifice 7B to a condenser cooler 8B and thence to an accumulator 9B.

The reaction chambers 98A and 98B are cylindrical chambers. Each chamber may be an unobstructed cylinder or either may have a center core (e.g., the center core labeled 97 in FIG. 2A ...) to provide an annular flow region, as is shown in FIGS. 2A, 2B, 3A, and 3B.

According to the present teaching, a fluid-solid mixture is introduced to a cylindrical or annular pressure chamber and while in the chamber is subjected to a tangential as well as a radial velocity field. The tangential velocity gives rise to a centrifugal acceleration and thereby causes the solids to experience a residence time different from the fluid, as a function of the density difference between the fluid and the solids and the tangential velocity of each. This feature is of importance in reactions in which a solid A (e.g., cellulose) is liquefied into a desired (intermediate) product B (e.g., sugar) and the product B can decompose within the reaction region to further unwanted products C (e.g., furfural, hydroxymethylfurfural). In order to optimize the yield of the product B, it is desirable that the solid A have a long residence time and the product B a short residence time. Furthermore, it is desirable to have countercurrent contacting between the liquid and solids. The concept herein disclosed provides systems to permit differing residence times and control of those residence times, and in one embodiment, countercurrent contacting.

Figure 2A:
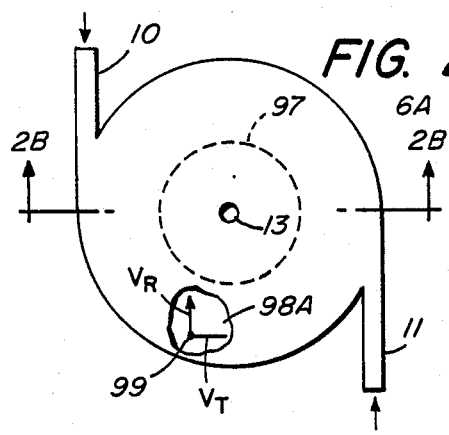
FIG. 2A is a diagrammatic plan view, partly cutaway, of one form of cyclone reactor.
Figure 2B:
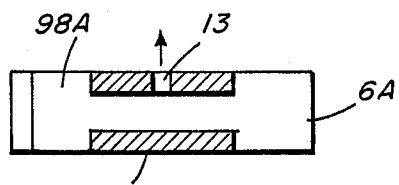
FIG. 2B is a section view taken on the line 2B—2B in FIG. 2A looking in the direction of the arrows.

A system employed for testing the present invention included the various elements shown in FIG. 1A and a reactor like that shown in FIGS. 2A and 2B. The reactor and the system are discussed in the Holland thesis and are now taken up.

The inside cylindrical diameter of the chamber 98A is 12 inches; the diameter of the center core 97 is 4.7 inches; the inside height of the cylinder is 0.55 inches. The reaction temperature ranged from 180° C. to 240° C. with pressure in the range from 200 psia to 550 psia. The total outflow at 13 ranged from 900 to 3900 milliliters per minute. Yields at these temperatures and pressures exceeded those from a plug flow reactor with the same conditions.

Further modifications of the invention herein disclosed will occur to persons skilled in the art and all such modifications are deemed to be within the scope of the invention as defined by the appended claims.

What is claimed:

1. A cocurrent-flow reactor system for the hydrolysis of cellulosic or lignocellulosic material to sugar comprising:

a hollow cylindrical reactor vessel having an internal reaction chamber defined by a peripheral annular wall and end walls having inwardly extending central cores to define a central portion of said chamber of less height than that at said peripheral wall;

first and second tangential entries coupled into said reaction chamber at the peripheral, annular wall thereof;

a source of slurry connected to said first tangential entry for introducing slurry as a cyclonic flow into said reaction chamber, said slurry including cellulosic or lignocellulosic solids and aqueous solution for hydrolysis of said solids to sugar, said solids being of greater density than said solution;

a steam boiler connected to said second tangential entry for introducing steam in support of said cyclonic flow and to provide heat for hydrolysis within said reaction chamber, said cylonic flow biasing slurry solids towards the outer periphery and slurry solution towards the central portion of said reaction chamber;

slurry discharge means disposed at the central portion of said reaction chamber for withdrawing slurry with solution of enriched sugar content, said slurry solids being retained longer than said solution within said reaction chamber due to the biasing of solids towards said peripheral wall by said cyclonic flow; and a let-down orifice coupled to said discharge means for reducing the slurry temperature and stopping the hydrolysis process.

2. The system of claim 1 wherein a condenser cooler is included in combination with said let-down orifice for effecting cooling and stopping the hydrolysis process.

3. A countercurrent-flow reactor system for the hydrolysis of cellulosic or lignocellulosic material to sugar comprising:

a hollow, cylindrical reactor vessel having an internal reaction chamber defined by a peripheral, annular wall and end walls having inwardly extending central cores to define a central portion of said chamber of less height than that at said peripheral wall;

a source of slurry connected to said reaction chamber radially inward from said peripheral, annular wall and radially outward from said central portion of said reaction chamber, said slurry including cellulosic or lignocellulosic solids and aqueous solution for hydrolysis of said solids to sugar, said solids being of greater density than said solution;

a steam boiler tangentially connected to the outer periphery of said reaction chamber for introducing steam and establishing cyclonic flow of solids and solution to bias solids towards the outer periphery and solution towards the central portion of said reaction chamber;

first discharge means at the outer periphery opposite to the tangential connection of said steam boiler for withdrawing solids-rich slurry from said reaction chamber;

said discharge means at said central portion for withdrawing solution-rich slurry from said reaction chamber at a location inwardly from said slurry source connection whereby a countercurrent flow of solution and solids is established; and first and second let-down orifices for stopping the hydrolysis process connected to said first and second discharge means respectively.

* * * * *